United States Patent
Choi et al.

(10) Patent No.: US 8,759,199 B2
(45) Date of Patent: Jun. 24, 2014

(54) METHOD OF SELECTIVELY GROWING SEMICONDUCTOR CARBON NANOTUBES USING LIGHT IRRADIATION

(75) Inventors: Won-mook Choi, Hwaseong-si (KR); Jae-young Choi, Suwon-si (KR); Jin Zhang, Beijing (CN); Guo Hong, Beijing (CN)

(73) Assignee: Samsung Electronics Co., Ltd. (KR)

( * ) Notice: Subject to any disclaimer, the term of this patent is extended or adjusted under 35 U.S.C. 154(b) by 827 days.

(21) Appl. No.: 12/879,087

(22) Filed: Sep. 10, 2010

(65) Prior Publication Data

US 2011/0111577 A1    May 12, 2011

(30) Foreign Application Priority Data

Nov. 12, 2009    (KR) ........................ 10-2009-0109186

(51) Int. Cl.
*H01L 21/36* (2006.01)
*H01L 21/20* (2006.01)

(52) U.S. Cl.
USPC ........... 438/478; 438/484; 438/487; 438/493; 438/500; 438/502; 438/962; 257/E21.085

(58) Field of Classification Search
None
See application file for complete search history.

(56) References Cited

U.S. PATENT DOCUMENTS

| | | | |
|---|---|---|---|
| 7,038,299 B2 | 5/2006 | Furukawa et al. | |
| 7,417,320 B2 * | 8/2008 | Kawabata et al. | 257/774 |
| 7,658,798 B2 * | 2/2010 | Ishida et al. | 117/95 |
| 7,736,741 B2 * | 6/2010 | Maruyama et al. | 428/408 |
| 7,820,133 B2 * | 10/2010 | Chen et al. | 423/447.3 |
| 8,143,144 B2 * | 3/2012 | Kawashima et al. | 438/478 |
| 8,148,820 B2 * | 4/2012 | Sato | 257/746 |
| 8,198,622 B2 * | 6/2012 | Kawashima et al. | 257/13 |
| 2005/0106846 A1 * | 5/2005 | Dubin | 438/585 |

FOREIGN PATENT DOCUMENTS

| | | |
|---|---|---|
| JP | 2005-067976 A | 3/2005 |
| JP | 2007-031239 A | 2/2007 |
| JP | 2009283303 A * | 12/2009 |
| KR | 1020090056787 A | 6/2009 |

OTHER PUBLICATIONS

Hong, et al., Direct Growth of Semiconductor Single-Walled Carbon Nanotube Array, J. Am. Chem. Soc. 2009, 131, 14642-14643.

* cited by examiner

*Primary Examiner* — Zandra Smith
*Assistant Examiner* — Khanh Duong
(74) *Attorney, Agent, or Firm* — Cantor Colburn LLP

(57) ABSTRACT

A method of selectively growing a plurality of semiconductor carbon nanotubes using light irradiation. The method includes disposing a plurality of nanodots, which include a catalyst material, on a substrate; growing a plurality of carbon nanotubes from the plurality of nanodots, and irradiating light onto the nanodot to selectively grow the plurality of semiconductor carbon nanotubes.

8 Claims, 5 Drawing Sheets

US 8,759,199 B2

METHOD OF SELECTIVELY GROWING SEMICONDUCTOR CARBON NANOTUBES USING LIGHT IRRADIATION

CROSS-REFERENCE TO RELATED APPLICATIONS

This application claims priority to Korean Patent Application No. 10-2009-0109186, filed on Nov. 12, 2009, and all the benefits accruing therefrom under 35 U.S.C. §119, the content of which in its entirety is herein incorporated by reference.

BACKGROUND

1. Field

The present invention relates to a semiconductor carbon nanotubes and methods of selectively growing the semiconductor carbon nanotubes using light irradiation.

2. Description of the Related Art

Carbon nanotubes have been intensively studied due to their one-dimensional structure, controllable conductivity, and unique mechanical strength.

When carbon nanotubes are manufactured using a commercial chemical vapor deposition ("CVD") method, metallic carbon nanotubes are formed together with semiconductor carbon nanotubes. Because the semiconductor carbon nanotubes are desirably used in semiconductor applications in the absence of metallic carbon nanotubes, methods of removing or separating the metallic carbon nanotubes from the semiconductor carbon nanotubes have been studied.

If a separation process is used, the as grown semiconductor carbon nanotubes may be removed together with the metallic carbon nanotubes when removing the metallic carbon nanotubes, thereby decreasing yield. Furthermore, when the metallic carbon nanotubes are removed from a mixture including the semiconductor carbon nanotubes and the metallic carbon nanotubes, the removing process may cause an undesirable structural defect in the semiconductor carbon nanotubes.

Thus there remains a need for an improved method providing semiconductor carbon nanotubes with the absence of metallic carbon nanotubes.

SUMMARY

In an embodiment, disclosed is a method of selectively growing a plurality of semiconductor carbon nanotubes using light irradiation when the plurality of carbon nanotubes are manufactured.

According to an aspect, a method of selectively growing the plurality of semiconductor carbon nanotubes using light irradiation includes disposing a plurality of nanodots, which include a catalyst material, on a substrate; growing a plurality of carbon nanotubes from the plurality of nanodots, and irradiating light onto the plurality of nanodots to selectively grow the plurality of semiconductor carbon nanotubes.

The substrate may be a sapphire substrate, and the plurality of carbon nanotubes may grow in a direction which is parallel to a crystallographic direction of the substrate.

The disposing of the plurality of nanodots may include disposing the plurality of nanodots in a row in a first direction, which is perpendicular to the crystallographic direction of the substrate.

The irradiating light onto the plurality of nanodots may include irradiating light on to the substrate through a slit which is elongated in the first direction.

The irradiating of light onto the plurality of nanodots may further include irradiating an ultraviolet ray having a wavelength of about 10 nanometers (nm) to about 1000 nm.

The irradiating of light onto the plurality of nanodots may further include irradiating an ultraviolet ray having a wavelength of about 10 nm to about 400 nm.

The irradiating light onto the plurality of nanodots may further include disposing the slit above an interface between the plurality of nanodots and the plurality of carbon nanotubes; and irradiating a light through the slit and onto the interface.

In an embodiment, at least one of the growing of the plurality of carbon nanotubes or the selectively growing the plurality of semiconductor carbon nanotubes may include contacting the plurality of nanodots with a carbonaceous material, wherein the carbonaceous material is acetylene, ethylene, ethanol, methane, or a combination including at least one of the foregoing.

Also disclosed is an apparatus for selectively growing a plurality of semiconductor carbon nanotubes. The apparatus includes a reaction chamber having a slit; a substrate disposed in the reaction chamber; and a plurality of nanodots disposed on the substrate in a region corresponding to the slit; wherein the slit is elongated in a direction perpendicular to a crystallographic direction of the substrate.

In an embodiment, the apparatus may further include an ultraviolet light.

In an embodiment, the ultraviolet light may be irradiated through the slit and onto the substrate.

In an embodiment, the plurality of nanodots is disposed in a row.

In an embodiment, the row is disposed in a direction perpendicular to a crystallographic direction of the substrate.

In an embodiment, the row is disposed in a direction which is parallel to a direction in which the slit is elongated.

In an embodiment, the row is disposed in a region corresponding to the slit.

BRIEF DESCRIPTION OF THE DRAWINGS

These and/or other aspects and advantages will become apparent and more readily appreciated from the following description of the embodiments, taken in conjunction with the accompanying drawings in which.

DETAILED DESCRIPTION

Figure 1:
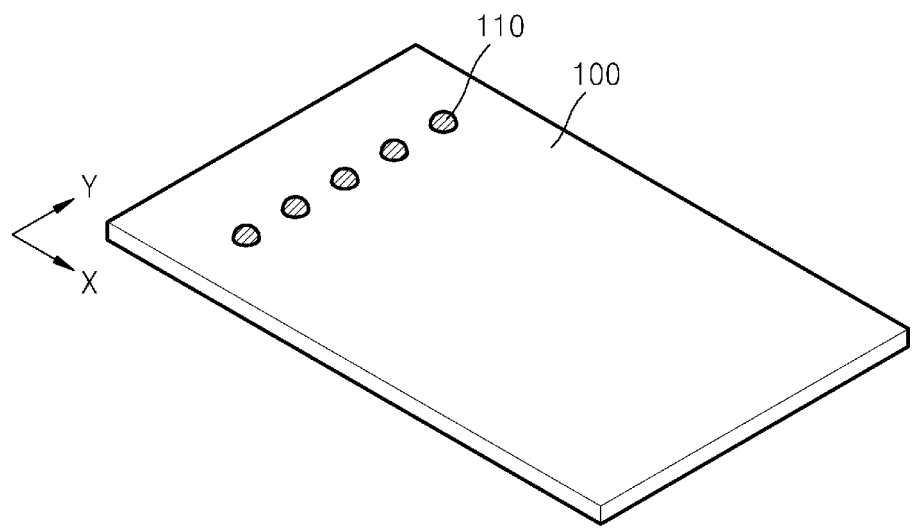
FIGS. 1 through 4 are perspective views which illustrate an embodiment of a method of selectively growing semiconductor carbon nanotubes using light irradiation.

Reference will now be made in detail to embodiments, examples of which are illustrated in the accompanying drawings, wherein, the thicknesses of layers and regions are exaggerated for clarity, like reference numerals refer to the like elements throughout, and detailed descriptions thereof will not be repeated.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

FIGS. 1 through 4 are perspective views which illustrate an embodiment of a method of selectively growing semiconductor carbon nanotubes using light irradiation.

Referring to FIG. 1, a plurality of nanodots 110, which comprise a catalyst material, are disposed on a substrate 100. The substrate 100 may be a sapphire substrate, and the carbon nanotubes may be grown in a substantially horizontal direction along a crystallographic direction (such as an X direction as shown in FIG. 1) of the substrate 100. The horizontal direction may be a direction which is parallel to a plane of the substrate, such as the X direction indicated in FIG. 1. The plurality of nanodots 110 may comprise at least one of Ni, Co, Fe, or an alloy thereof, and may be disposed (e.g., formed) on the substrate 100. The plurality of nanodots 110 may have a diameter of about 10 nanometers (nm) to about 1000 nm, specifically about 50 nm to about 500 nm, more specifically about 100 nm to about 250 nm. The plurality of nanodots 110 may be arranged in a Y direction a selected distance apart from each other. As shown in FIG. 1, the plurality of nanodots 110 may be arranged linearly, but the present disclosure is not limited thereto. In an embodiment, a plurality of nanodots 110 may be disposed along a distance of less than or equal to about 5 millimeters (mm), specifically less than or equal to about 4 mm, more specifically less than or equal to about 1 mm. In an embodiment, the plurality of nanodots may be disposed along a distance of about 0.001 mm to about 5 mm, specifically about 0.01 to about 4 mm, more specifically about 0.1 mm to about 1 mm.

The plurality of nanodots 110 may be previously manufactured, but the present invention is not limited thereto. For example, the plurality of nanodots 110 may be formed by patterning a catalyst thin film, which comprises a catalyst material, after disposing (e.g., forming) the catalyst thin film on the substrate 100.

Figure 2:
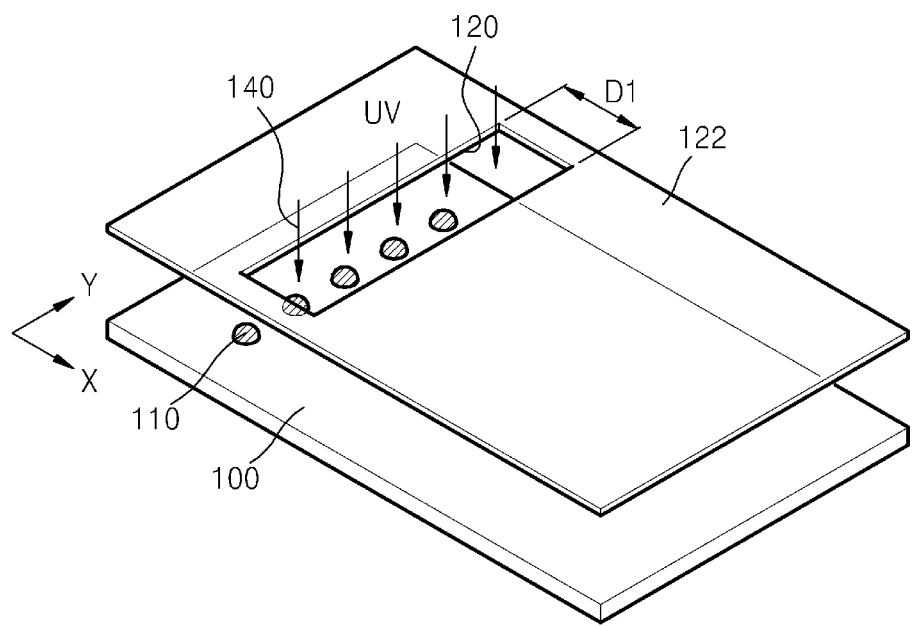

Referring to FIG. 2, the substrate 100 may be placed in a reaction chamber 122 of a chemical vapor deposition ("CVD") apparatus. For clarity and convenience, FIG. 2 shows only a portion of an upper part of the reaction chamber 122. In an embodiment, a slit 120 is disposed (e.g., formed) in the upper part of the reaction chamber 122. The slit 120 may be disposed (e.g., formed) inside the reaction chamber 122 or on the reaction chamber 122. In an embodiment, the plurality of nanodots 110 are arranged in a Y direction, and the slit 120 is elongated in the Y direction, as shown in FIG. 2. The slit 120 may be disposed (e.g., formed) to have a width D1 of approximately 10 mm, specifically about 8 mm, more specifically about 6 mm in the X direction. In an embodiment, the slit 120 may be separated by approximately a few mm, e.g., about 0.1 mm to about 10 mm, specifically about 0.5 m to about 8 mm, more specifically about 1 mm to about 5 mm, from the plurality of nanodots 110 in the X direction.

An ultra-violet ("UV") irradiation apparatus (not shown) may be disposed above the reaction chamber 122. A UV ray 140 irradiated from the UV irradiation apparatus may be irradiated through the slit 120 onto firstly grown carbon nanotubes 130 (refer to FIG. 3), which are grown on the substrate 100. The UV ray 140 may have a wavelength of about 10 nm to about 1000 nm, specifically about 100 nm to about 800 nm, more specifically about 10 nm to about 400 nm.

Other forms of light may be used instead of the UV ray. For example, a light having a wavelength of about 10 nanometers to about 1000 nm, specifically about 100 nm to about 800 nm, more specifically about 10 nm to about 400 nm, may be used.

Figure 3:
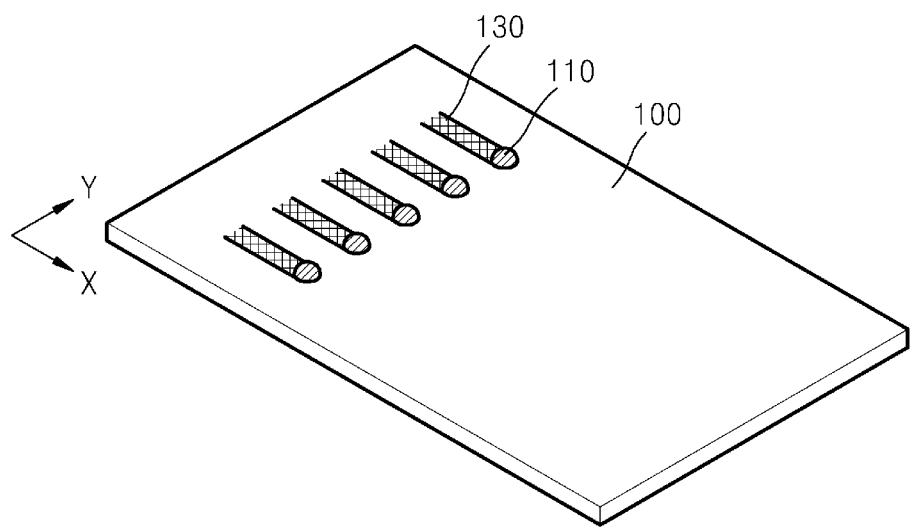

Referring to FIG. 3, a carbon containing gas, for example, acetylene, ethylene, ethanol, methane, or a combination comprising at least one of the foregoing, is supplied into the reaction chamber 122. The carbon containing gas is contacted with the substrate 100, and the firstly grown carbon nanotubes 130 may linearly grow along a crystallographic direction (e.g., the X direction) of the substrate 100 from the plurality of nanodots 110. In an embodiment, the X direction may be a [100], [101], or a [001] direction of the substrate, for example. In an embodiment, a carbon nanotube may linearly grow from each respective nanodot of plurality of nanodots. Prior to irradiating with a UV ray, the firstly grown carbon nanotubes 130 may have a length of about 0.01 mm to about 10 mm, specifically about 1 mm to about 8 mm, more specifically about 2 mm to about 6 mm, thus the carbon nanotube may have a length of a few mm. Also, the firstly grown carbon nanotubes 130, which are grown prior to irradiating with the UV ray, may include metallic carbon nanotubes and semiconductor carbon nanotubes. Thus each carbon nanotube of the firstly grown carbon nanotubes 130 may be a metallic carbon nanotube or a semiconductor carbon nanotube.

Figure 4:
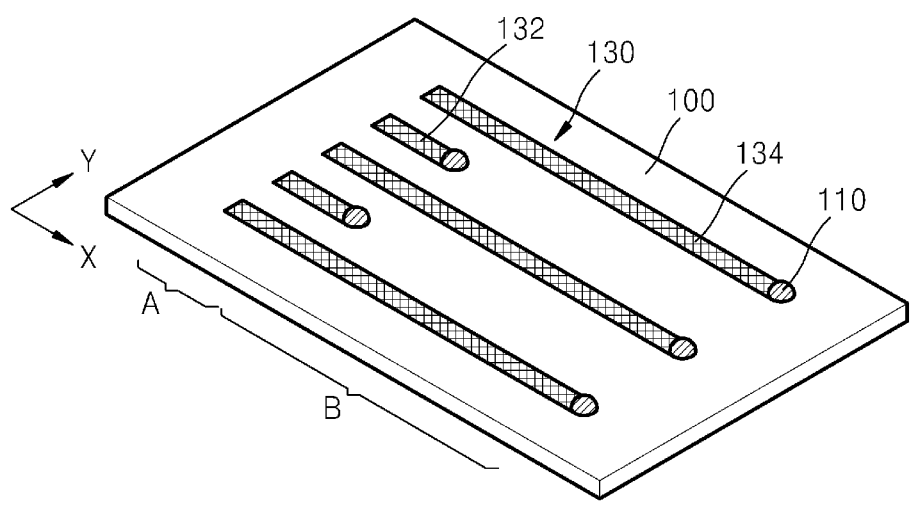

Referring to FIG. 4, when a UV ray 140 (refer to FIG. 2) is irradiated onto an interface between the plurality of nanodots 110 and the firstly grown carbon nanotubes 130 through the slit 120 (refer to FIG. 2) using the UV irradiation apparatus, the growth of the metallic carbon nanotubes 132, if present, is substantially or effectively stopped, and accordingly, only the semiconductor carbon nanotubes 134 continue to grow. Thus the growth of the semiconductor carbon nanotubes may be effectively selected using UV irradiation.

Figure 5:
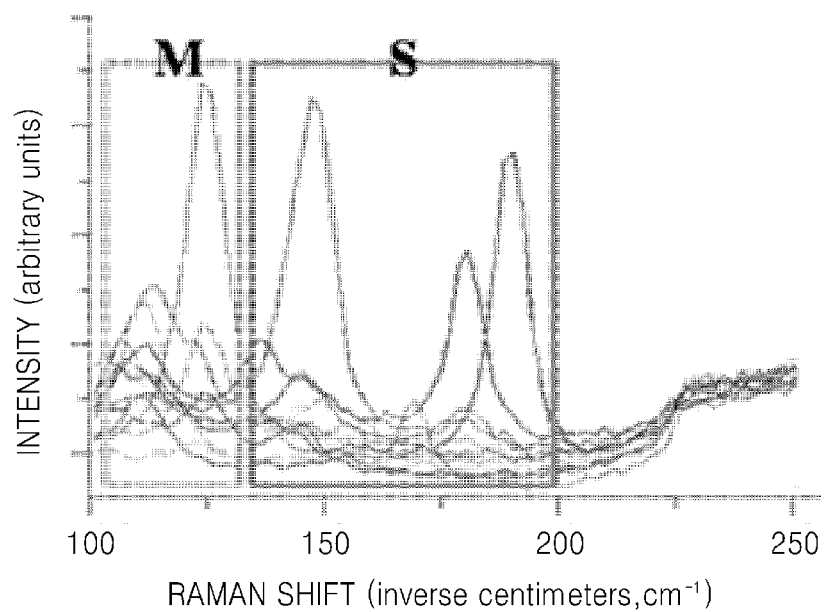
FIG. 5 is a graph of intensity (arbitrary units, a.u.) versus Raman shift (inverse centimeters, $cm^{-1}$) showing a Raman spectrum of an embodiment of carbon nanotubes in a region A of FIG. 4.
Figure 6:
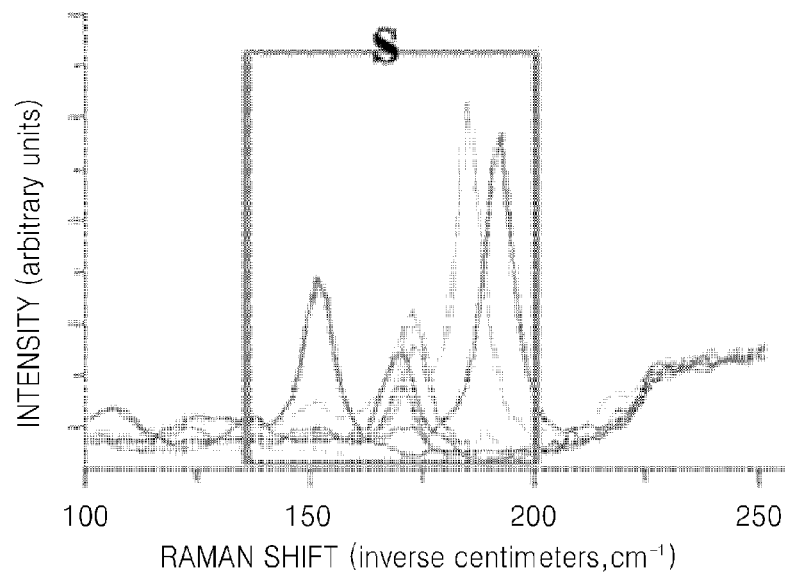
FIG. 6 is a graph of intensity (arbitrary units, a.u.) versus Raman shift (inverse centimeters, $cm^{-1}$) showing a Raman spectrum of an embodiment of semiconductor carbon nanotubes in a region B of FIG. 4.

FIG. 5 is a Raman spectrum of the firstly grown carbon nanotubes 130 in a region A of FIG. 4, and FIG. 6 is a Raman spectrum of the semiconductor carbon nanotubes 134 in a region B of FIG. 4. To obtain the Raman spectrums of FIGS. 5 and 6, a laser beam having a wavelength of 514.5 nm is used. In FIGS. 5 and 6, "S" indicates peaks of the semiconductor carbon nanotubes 134 and "M" indicates peaks of the metallic carbon nanotubes 132.

Referring to FIG. 5, it is seen that region A includes both the metallic carbon nanotubes, e.g. metallic carbon nanotubes 132, and the semiconductor carbon nanotubes, e.g., the semiconductor carbon nanotubes 134.

Referring to FIG. 6, it is seen that only the semiconductor carbon nanotubes 134 are present in the region B, thus only the semiconductor carbon nanotubes 134 are grown in the region B. This shows that the method of irradiation of light according to the current embodiment allows the semiconductor carbon nanotubes 134 to grow, and substantially prevents or effectively eliminates growth of the metallic carbon nanotubes 132.

Figure 7:
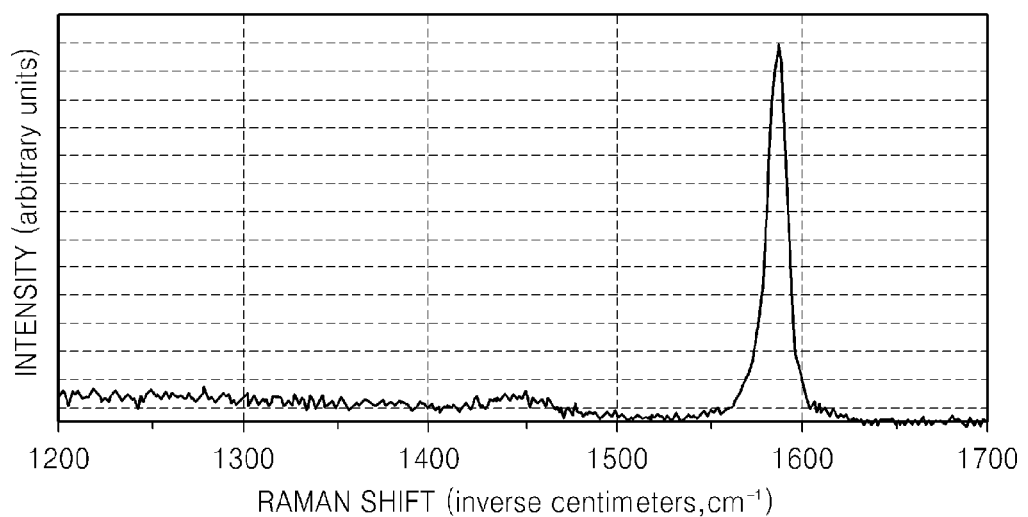
FIG. 7 is a graph of intensity (arbitrary units, a.u.) versus Raman shift (inverse centimeters, $cm^{-1}$) showing a Raman spectrum of an embodiment of a selectively grown semiconductor carbon nanotubes.

FIG. 7 is a graph of a Raman spectrum of an embodiment of selectively grown semiconductor carbon nanotubes. Referring to FIG. 7, a well-developed peak is seen at a wave number of 1590 inverse centimeters ($cm^{-1}$), and a defect peak is effectively not present at a wave number of 1350 $cm^{-1}$. This shows that a UV laser ray does not generate a defect in the structure of the grown semiconductor carbon nanotubes.

Figure 8:
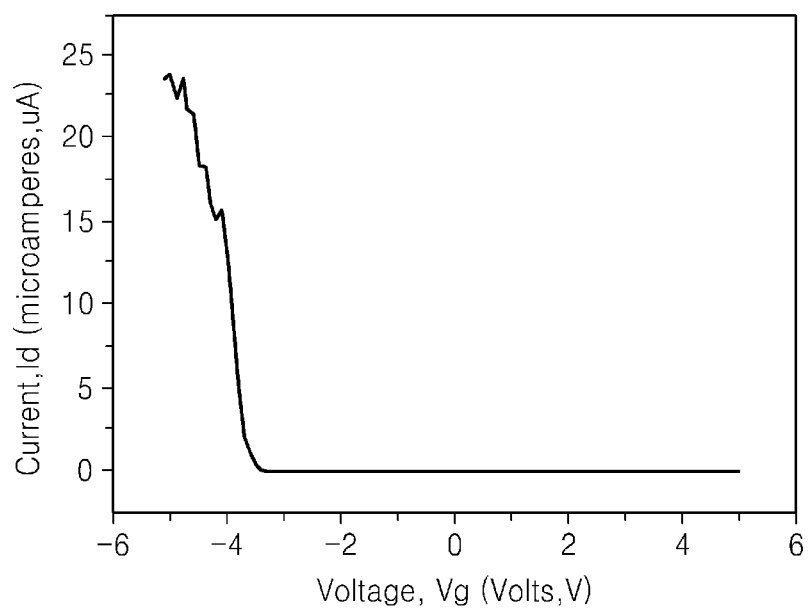
FIG. 8 is a graph of current (microamperes, $\mu A$) versus volts (volts, V) showing current-voltage ("IV") characteristics of an embodiment of a field effect transistor using carbon nanotubes grown according to an embodiment as a channel of the field effect transistor.

FIG. 8 is a graph showing current-voltage ("IV") characteristics of a field effect transistor using carbon nanotubes grown according to an embodiment as a channel of the field effect transistor. A bias voltage applied to the carbon nanotube field effect transistor was 100 millivolts (mV), a channel length was 5.6 micrometers (μm), and a thickness of a silicon oxide on a back gate comprising a silicon substrate was 800 nm. The On/Off ratio of the field effect transistor, which is a characteristic of a transistor, was $10^4$ or greater. As used herein, the term On/Off ratio refers to a ratio of the source-drain current when a transistor is on to the source-drain current when the transistor is off.

As in the foregoing embodiment, and while not wanting to be bound by theory, it is believed that the reason why the growing of the metallic carbon nanotubes 132 is repressed when an UV ray is irradiated thereto is that the UV ray makes a carbon source, such as methane (e.g., $CH_4$), include a free radical, and the free radical hinders the growing of the metallic carbon nanotube by selectively attacking the metallic carbon nanotube.

According to an embodiment, when preparing a well developed (e.g. refined or purified) semiconductor carbon nanotubes, a process of removing metallic carbon nanotubes may be substantially reduced or effectively eliminated, and thus, a manufacturing yield of the semiconductor carbon nanotubes may be increased.

While this invention has been particularly shown and described with reference to preferred embodiments thereof and to the accompanying drawings, it will be understood by those skilled in the art that various changes in form and details may be made therein without departing from the spirit of this disclosure. Therefore, the scope of the invention is defined not by the detailed description but by the appended claims.

What is claimed is:

1. A method of selectively growing a plurality of semiconductor carbon nanotubes using light irradiation, the method comprising:
   disposing a plurality of nanodots, which comprise a catalyst material, on a substrate;
   growing a plurality of carbon nanotubes from the plurality of nanodots; and
   irradiating light onto the plurality of nanodots to selectively grow the semiconductor carbon nanotubes.

2. The method of claim 1, wherein the substrate is a sapphire substrate, and the plurality of carbon nanotubes grow in a direction which is substantially parallel to a crystallographic direction of the substrate.

3. The method of claim 2, wherein the disposing of the plurality of the nanodots comprises disposing the plurality of nanodots in a row in a first direction, which is perpendicular to the crystallographic direction of the substrate.

4. The method of claim 3, wherein the irradiating light onto the plurality of nanodots comprises irradiating light on to the substrate through a slit which is elongated in the first direction.

5. The method of claim 4, wherein the irradiating light onto the plurality of nanodots further comprises irradiating an ultraviolet ray having a wavelength of about 10 nanometers to about 1000 nanometers.

6. The method of claim 5, wherein the irradiating light onto the plurality of nanodots further comprises irradiating an ultraviolet ray having a wavelength of about 10 nanometers to about 400 nanometers.

7. The method of claim 4, wherein the irradiating light onto the plurality of nanodots further comprises:
  disposing the slit above an interface between the plurality of nanodots and the plurality of carbon nanotubes; and
  irradiating a light through the slit and onto the interface.

8. The method of claim 1, wherein at least one of the growing of plurality of the carbon nanotubes or the selectively growing the plurality of semiconductor carbon nanotubes comprises contacting the plurality of nanodots with a carbonaceous material, wherein the carbonaceous material is acetylene, ethylene, ethanol, methane, or a combination comprising at least one of the foregoing.

* * * * *